United States Patent
Fulton et al.

(10) Patent No.: US 11,598,237 B2
(45) Date of Patent: Mar. 7, 2023

(54) AUTOMATIC DRAINING OF WATER-FUEL SEPARATOR VIA DOWNSTREAM INJECTION SYSTEM

(71) Applicant: FORD GLOBAL TECHNOLOGIES, LLC, Dearborn, MI (US)

(72) Inventors: Brien Lloyd Fulton, Bloomfield Hills, MI (US); Carlos Armesto, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/201,027

(22) Filed: Mar. 15, 2021

(65) Prior Publication Data
US 2022/0290593 A1    Sep. 15, 2022

(51) Int. Cl.
*F01N 3/00*      (2006.01)
*F01N 3/025*     (2006.01)
*F01N 3/36*      (2006.01)

(52) U.S. Cl.
CPC .............. *F01N 3/0253* (2013.01); *F01N 3/36* (2013.01); *F01N 2250/02* (2013.01); *F01N 2260/04* (2013.01); *F01N 2610/03* (2013.01); *F01N 2610/1406* (2013.01); *F01N 2610/1426* (2013.01); *F01N 2610/1453* (2013.01)

(58) Field of Classification Search
CPC ...... F01N 3/0253; F01N 3/36; F01N 2250/02; F01N 2260/04; F01N 2610/03; F01N 2610/1406; F01N 2610/1426; F01N 2610/1453; B01D 36/005
See application file for complete search history.

(56) References Cited

U.S. PATENT DOCUMENTS

| | | | |
|---|---|---|---|
| 4,637,351 A | 1/1987 | Pakula | |
| 7,415,819 B2 | 8/2008 | Ruona | |
| 2006/0277899 A1* | 12/2006 | Ruona | F01N 3/04 60/310 |
| 2007/0039865 A1* | 2/2007 | Jiang | B01D 36/003 210/259 |
| 2008/0110812 A1* | 5/2008 | Jensen | F02M 25/0222 137/1 |
| 2011/0147290 A1* | 6/2011 | Braunheim | F02M 37/34 210/259 |
| 2011/0209467 A1* | 9/2011 | Perry | F01N 3/2066 60/303 |
| 2016/0010002 A1* | 1/2016 | Norling | B01J 19/008 196/46 |
| 2016/0059161 A1* | 3/2016 | Heine | B01D 29/90 210/109 |
| 2017/0107957 A1* | 4/2017 | Abdalla | B01D 36/003 |
| 2018/0274505 A1* | 9/2018 | Wieczorek | B01D 36/003 |

FOREIGN PATENT DOCUMENTS

DE     10334042 A1     2/2005

* cited by examiner

*Primary Examiner* — Matthew T Largi
(74) *Attorney, Agent, or Firm* — Vincent Mastrogiacomo; Brooks Kushman P.C.

(57) ABSTRACT

A diesel engine system includes an engine, an exhaust system connected to the engine, and a water-fuel separator. The exhaust system has an aftertreatment device, an exhaust pipe upstream of the aftertreatment device, and a fuel injector connected to the exhaust pipe. The water-fuel separator has a filter configured to separate water from fuel and a reservoir configured to store the separated water. The reservoir is in fluid communication with the fuel injector.

9 Claims, 4 Drawing Sheets

AUTOMATIC DRAINING OF WATER-FUEL SEPARATOR VIA DOWNSTREAM INJECTION SYSTEM

TECHNICAL FIELD

This disclosure relates to diesel engine systems and more particularly to a water-fuel separator that is integrated with a downstream injection system for automatic draining of the water-fuel separator.

BACKGROUND

Diesel engine systems may include a water-fuel separator that removes water from the fuel before delivery to the engine. A typical water-fuel separator includes a filter configured to separate water from fuel and a reservoir for storing the separated water. The reservoir typically includes a drain plug that is removable to drain the separated water. Failure to regularly drain the reservoir may result in water reaching the engine.

SUMMARY

According to one embodiment, a diesel engine system includes an engine, an exhaust system connected to the engine, and a water-fuel separator. The exhaust system has an aftertreatment device, an exhaust pipe upstream of the aftertreatment device, and a fuel injector connected to the exhaust pipe. The water-fuel separator has a filter configured to separate water from fuel and a reservoir configured to store the separated water. The reservoir is in fluid communication with the fuel injector.

According to another embodiment, a diesel engine system includes an engine and an exhaust system connected to the engine. The exhaust system has an aftertreatment device, an exhaust pipe upstream of the aftertreatment device, and a fuel injector connected to the exhaust pipe. A water-fuel separator of the engine system has a filter configured to separate water from fuel, a reservoir configured to store the separated water, and a reservoir-drain port opening into the reservoir. A fuel line connects the reservoir-drain port in fluid communication with the fuel injector.

According to yet another embodiment, a diesel engine system has an engine and an exhaust system having an aftertreatment device and a fuel injector upstream of the aftertreatment device. The system further includes a primary water-fuel separator having a first reservoir and a secondary water-fuel separator having a second reservoir. The first and second reservoirs are arranged to supply fuel to the fuel injector.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
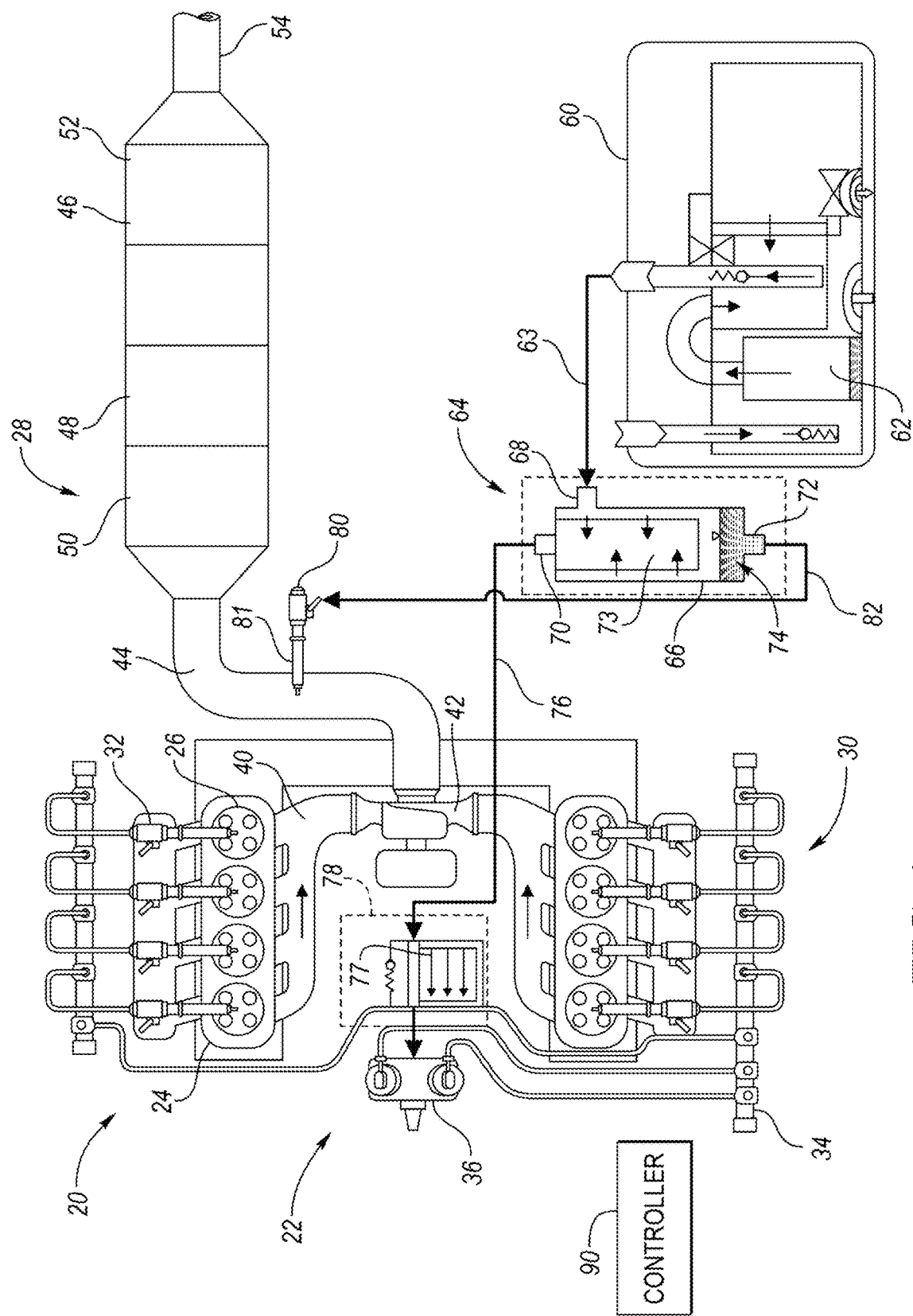
FIG. 1 is a diagrammatical view of a diesel engine system according to one or more embodiments.

Referring to FIG. 1, a diesel engine system 20 includes a diesel engine 22. In the illustrated embodiment, the example engine 22 is a V-8 including a pair of cylinder banks 24 each having four cylinders 26. Other engine layouts are contemplated such as an inline six cylinder or the like.

An exhaust system 28 discharges the combusted air-fuel charge from the engine away from the vehicle. The exhaust system 28 includes a pair of exhaust manifolds 40 that are attached to the engine 22. The exhaust manifolds 40 are in fluid communication with the associated cylinders 26 through exhaust ports and valves. In the illustrated embodiment, a turbocharger 42 is provided on the engine 22 and is connected with the exhaust manifolds 40. An outlet of the turbocharger 42 is connected to an exhaust pipe 44. Downstream of the exhaust pipe 44 is an aftertreatment device 46. The aftertreatment device 46 is configured to optimum efficiency to reduce engine feed-gas emissions to meet regulatory requirements. The device 46 may include one or more of a diesel oxidation catalyst (DOC) 50, a diesel particulate filter (DPF) 48, and a selective catalyst reduction (SCR) system 52. One or more additional exhaust pipes 54 may be connected downstream of the aftertreatment device 46. The exhaust pipe(s) 54 connect with a muffler(s) and subsequently to the tailpipe or other outlet that releases the exhaust gases to the atmosphere.

A fuel system 30 delivers fuel to the engine 22. The fuel system 30 includes fuel injectors 32 configured to inject fuel into an associated one of the cylinders 26 in the illustrated embodiment. The fuel injectors 32 are connected to fuel rails 34 that receive pressurized fuel from a high-pressure fuel pump 36. The high-pressure fuel pump 36 receives fuel from the fuel tank 60. A low-pressure fuel pump 62 may be located within the fuel tank 60. The low-pressure fuel pump 62 is configured to supply pressurized fluid to a fuel-water separator 64 (also known as a fuel filter).

The water-fuel separator 64 is configured to separate water from the fuel to prevent damage to the high-pressure fuel system or other components. The separator 64 may include a housing 66 having a raw-fuel inlet port 68 connected to the fuel pump 62 by fuel line 63, a cleaned-fuel outlet port 70 connected to the high-pressure pump 36, and a reservoir-drain port 72. The fuel line 63 may also be known as conduit, tubing, hose, or the like. Within the housing 66 is a chamber containing a filter 73. The filter 73 may be cylindrical and define an interior in fluid communication with the outlet port 70. Other filter designs are also contemplated. For example, the fuel filter may have a rectangular shape. During operation, fuel enters the chamber through the port 68 and subsequently passes through the filter 73. The filter 73 generally prevents the passage of water and permits the passage of fuel. The blocked water is collected in a water reservoir 74 located at the bottom of the housing 66. (While referred to as "water," in practice, the water may be mixed with fuel to form a water-fuel mixture that accumulates within the reservoir 74.) The reservoir 74 is in fluid communication with the drain 72. For example, the drain 72 may include a hole defined in housing 66 at the bottom of the reservoir 74 and a hose fitting attached to the hole.

The fuel system 30 may include only a single water-fuel separator or may include a pair of separators. The water-fuel separator 64 may be referred to as the primary separator and the downstream water-fuel separator 78 may be referred to as the secondary separator. In this example, a fuel line 76 connects the clean outlet port 70 of the primary water-fuel separator 64 to an inlet port of the secondary water-fuel separator 78. An outlet port of the secondary water-fuel separator 78 is connected to the high-pressure fuel pump 36. The secondary water-fuel separator 78 may include a filter 77 designed to separate the fuel and water as described above. The secondary water-fuel separator 78 may or may not include a water reservoir.

The diesel particulate filter 48 traps soot and other particulate matter of the exhaust gas to prevent emission to the atmosphere. Over time, the filter 48 can become full of accumulated particles. These particles can be removed by heating the exhaust gas within the aftertreatment device to burn off the accumulated particulate. This is known as filter regeneration. The exhaust gas temperatures produced by normal operation of the engine may be insufficient to regenerate the DPF 48. The exhaust system 28 includes a downstream injection system (DSI) configured to deliver fuel into the exhaust. The DSI includes a downstream fuel injector 80 configured to selectively inject fuel into the exhaust pipe 44 that is upstream of the aftertreatment device 46. This fuel passes through a diesel oxidation catalyst 50 within the aftertreatment device 46 causing combustion and raising the temperature of the exhaust gases to burn off the accumulated particulate on the filter 48 thus regenerating it. Regenerating the DPF 48 may not be the sole job for the downstream fuel injector 80. For example, the fuel may be injected into the exhaust system to generate heat when the exhaust gases alone are insufficient to maintain the aftertreatment device 46 above a desired temperature, e.g., a light-off temperature of the catalysts. The downstream injector 80 may also be used during cold start to decrease warmup time of the aftertreatment device.

The injector 80 includes a body 81 attached to the pipe 44. The body 81 defines an inlet port that connects with a fuel line 82. The inlet port is selectively connected in fluid communication with a nozzle or other means for atomizing the fuel. A solenoid may be used to control a valve that opens and closes to selectively spray fuel from the nozzle.

Rather than relying on scheduled maintenance to manually drain the water reservoir 74, the engine system 20 utilizes an automatic system in which the water-fuel mixture is disposed of in the exhaust system 28. For example, rather than having the injector 80 draw cleaned fuel, e.g., from fuel line 76, the injector 80 draws fuel from the water reservoir 74. This way, the water reservoir 74 is at least partially drained every time the injector 80 is activated during normal operation of the DSI, which should be sufficient to maintain the water-fuel mixture within the reservoir 74 below a threshold level in most instances. In the illustrated embodiment, a fuel line 82 is connected between the drain 72 and the injector 80. When the valve within the injector 80 is open, fuel—potentially containing water—is drawn from the bottom of the reservoir 74 and injected into the exhaust system.

The engine systems described herein may include one or more controllers such as a powertrain control unit (PCU) and/or an engine control module (ECM). The controller may be part of a larger control system and may be controlled by various other controllers throughout a motor vehicle, such as a vehicle system controller (VSC). It should therefore be understood that the controller, e.g., controller 90 or 180, and one or more other controllers can collectively be referred to as a "controller" that controls various actuators in response to signals from various sensors to control functions. The controller may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller within each of the systems and subsystems identified above.

The water-fuel separator 64 may include a sensor (not shown) that is configured to sense a volume of the water contained within the reservoir 74. The sensor may be in electric communication with the controller 90. Using the sensor, or other means, it is possible to determine if the water within the reservoir exceeds the threshold. The threshold may be based on a level, e.g., a height, of water within the housing 66. For example, if the water in the reservoir 74 exceeds this level, this may indicate that the water threshold has been surpassed.

Normal operation of the DSI should maintain the water below the threshold in most instances. However, it is possible for a slug of water in the fuel to cause the water threshold to be exceeded. In this instance, operation of the DSI may be modified to immediately drain the water below the threshold. For example, the controller 90 may be programmed to activate the DSI to inject fuel into the exhaust system when the water threshold is exceeded regardless of the normal operating parameters of the DSI, which are based on the conditions and requirements of the exhaust system. Once the water drops below the threshold, the DSI may resume normal operation.

Figure 2:
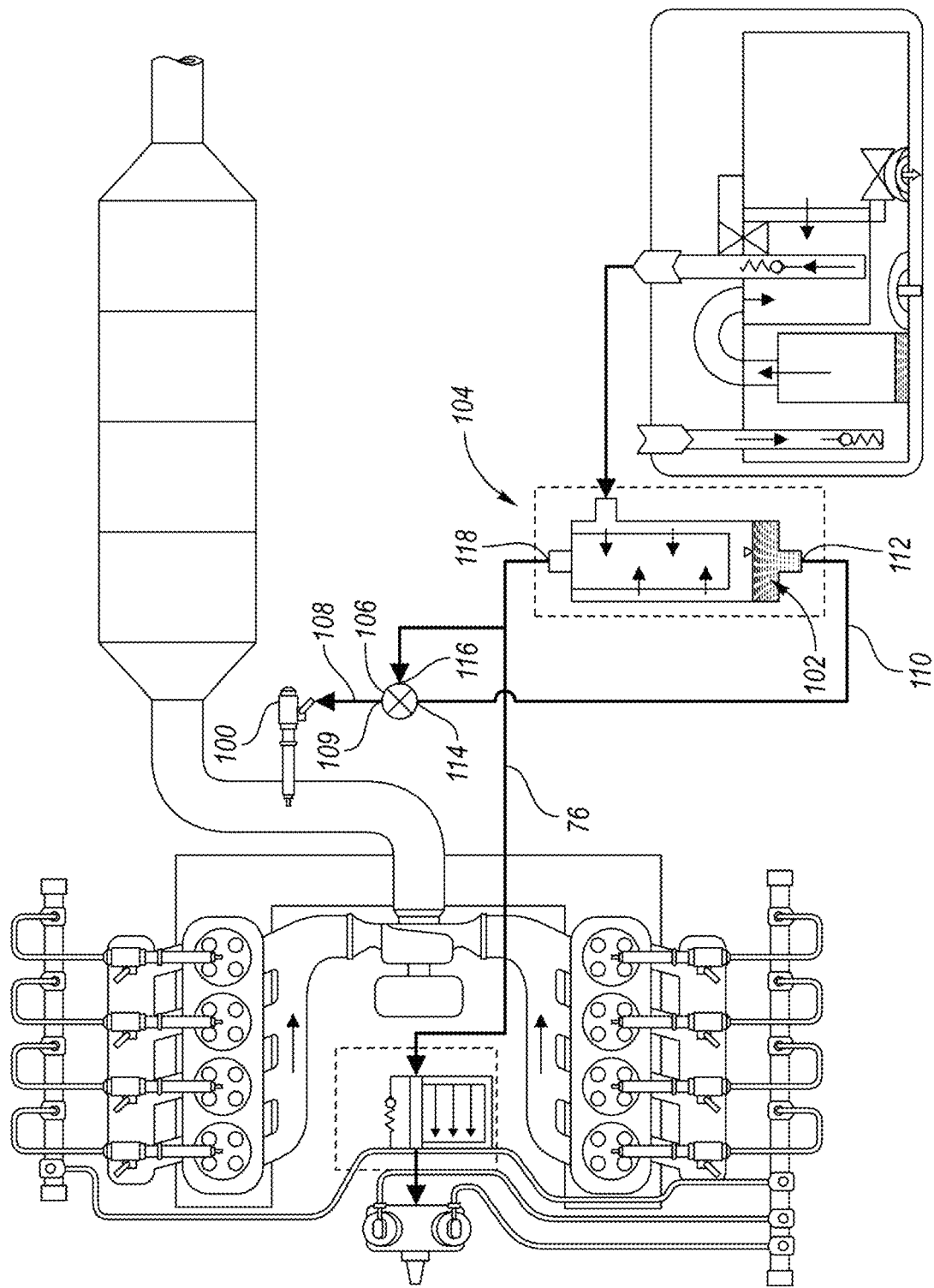
FIG. 2 is a diagrammatical view of another diesel engine system according to an alternative embodiment.

The following figures and related text describe alternative embodiments of FIG. 1 and for brevity common components and functionality will not be explained again. Referring to FIG. 2, a downstream fuel injector 100 may be configured to receive fuel from either the water reservoir 102 of a water-fuel separator 104 or cleaned fuel based on the position of a valve 106. The valve 106 includes an outlet 109 connected to the DSI injector 100 such as by fuel line 108. A first inlet 114 of the valve 106 may be connected to the water reservoir 102 by a fuel line 110. The fuel line 110 may connect with a reservoir-drain port 112. A second inlet 116 is connected to a cleaned-fuel outlet port 118 of the water-fuel separator 104. The valve 106 may include a first position in which the injector 100 draws fuel from the bottom of the reservoir 102 and a second position in which the injector 100 draws only cleaned fuel from the outlet port 118. In some embodiments, the valve 106 may include a third position in which both the inlet ports 114 and 116 are in fluid communication with the outlet port 109.

Figure 3:
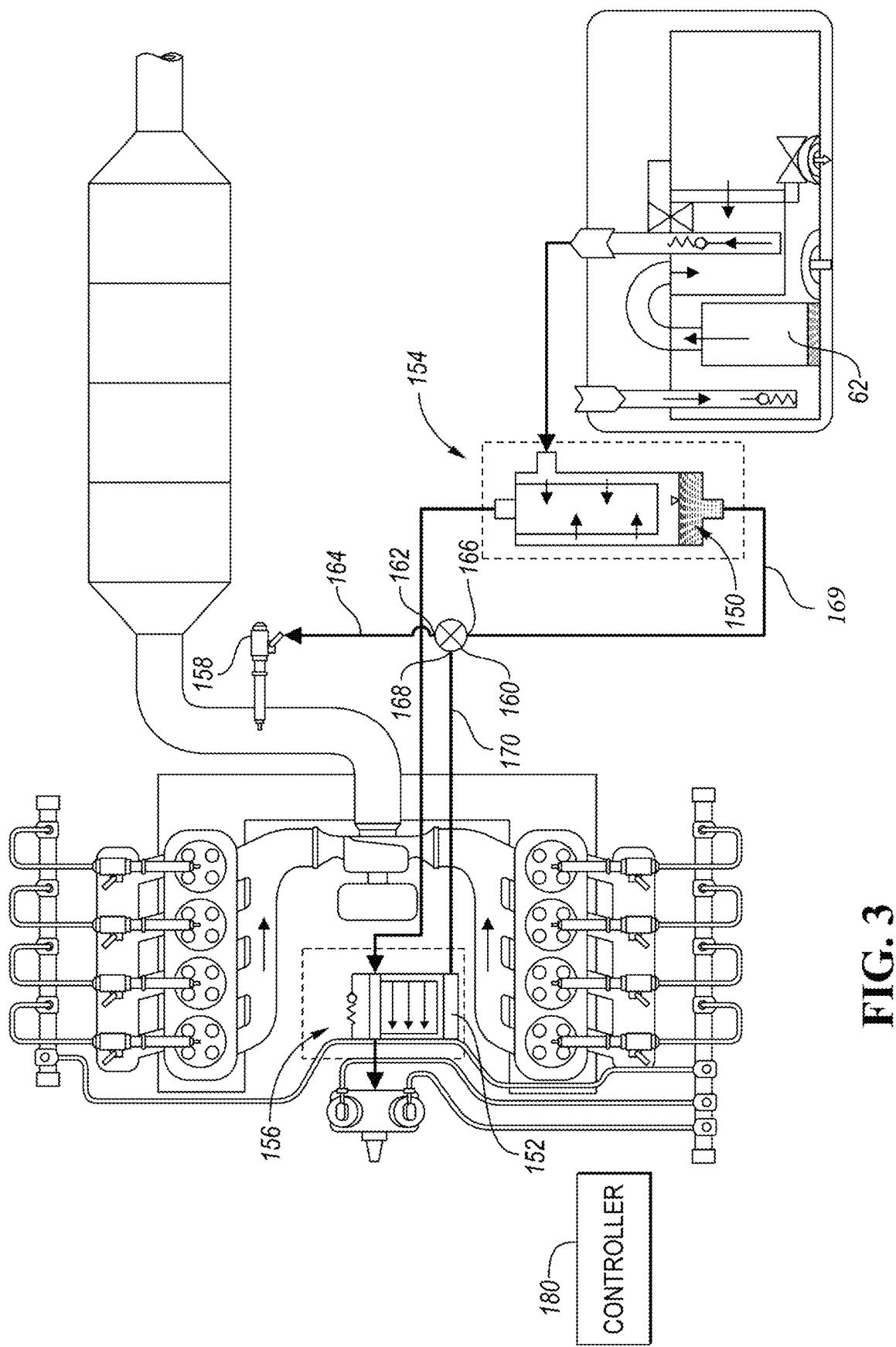
FIG. 3 is a diagrammatical view of yet another diesel engine system according to a further embodiment.

FIG. 3 illustrates an example embodiment in which both of the primary and secondary reservoirs 150, 152 of the primary and secondary water-fuel separators 154, 156 are in fluid communication with the downstream fuel injector 158. The system may include a valve 160 that selectively connects the DSI fuel injector 158 in fluid communication with the primary and/or secondary separator 154, 156. The valve 160 may include an outlet 162 connected in fluid communication with the fuel injector 158 such as by a fuel line 164. A first inlet 166 of the valve 160 is connected in fluid communication with the reservoir 150 such as by a fuel line 169 that connects to a reservoir-drain port or fitting. A second inlet 168 is connected in fluid communication with the reservoir 152 such as by a fuel line 170 that connects to a reservoir-drain port or fitting. The valve 160 may include a first position in which the water reservoir 150 is in fluid communication with the injector 158 and a second position in which the reservoir 152 is in fluid communication with the injector 158. The valve 160 may also include third position in which the fuel injector 158 is in fluid communication with both of the reservoirs 150, 152.

Figure 4:
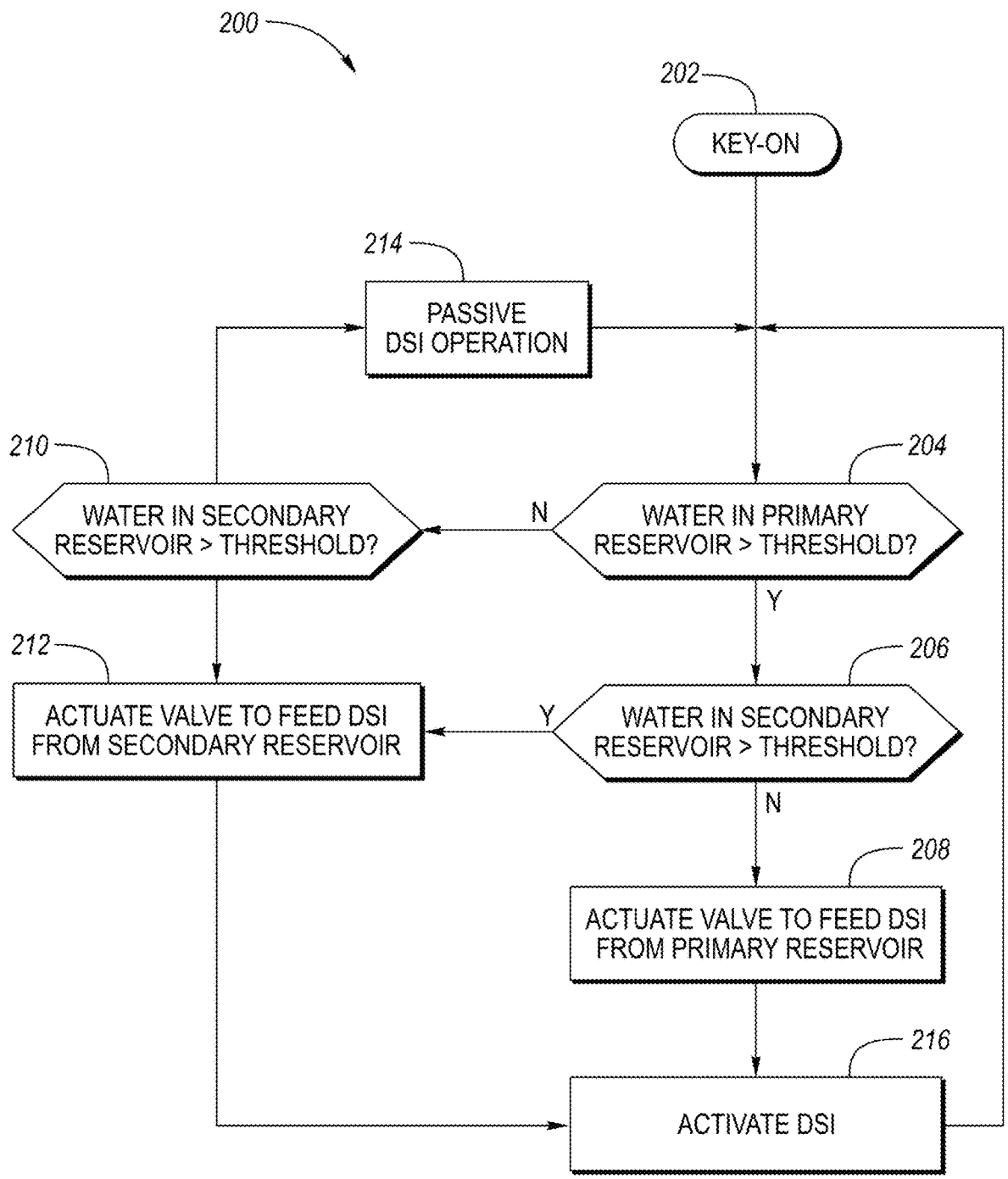
FIG. 4 is a flowchart of an algorithm for operating at least the diesel engine system shown in FIG. 3.

FIG. 4 illustrates a flowchart 200 of an algorithm for controlling an engine system. The controller 180 may be programmed to execute the flowchart 200. The controls begin with key-on of the ignition system at operation 202. At operation 204, the controller determines if water within the primary reservoir is greater than a threshold. If yes, control passes to operation 206 and the controller determines if water within the secondary reservoir is greater than a threshold. If yes, control passes operation 212.

The secondary reservoir may be smaller than the primary reservoir and is also closer to the engine than the primary reservoir. As such, the controls 200 may prioritize the draining of the secondary reservoir over the primary reservoir as shown in the illustrated embodiment. In other embodiments, the primary reservoir may be prioritized over the secondary reservoir or no priority may be given. At operation 212, the controller actuates the valve to provide fuel to the DSI from the secondary reservoir. For example, the valve 160 may be actuated to the second position. The controller will then activate the DSI, independent of exhaust aftertreatment requirements or conditions, to drain the secondary reservoir at operation 216.

Once the secondary reservoir is drained below the threshold, the controller will then drain the primary reservoir, i.e., a no at operation 206. In operation 208, the controller actuates the valve to provide fuel to the DSI from the primary reservoir. For example, the valve 160 may be actuated to the first position. The controller then activates (or continues activation of) the DSI, independent of exhaust aftertreatment requirements or conditions, to drain the primary reservoir at operation 216.

If the water in the primary reservoir is less than the threshold, e.g., no at operation 204, control passes to operation 210 and the controller determines if water within the secondary reservoir exceeds the threshold. If yes, control passes to operation 212 and the valve is actuated to feed the DSI from the secondary reservoir and the DSI is activated at operation 216 as described above.

If no at operation 210, i.e., water in both the primary and secondary reservoirs is less than the thresholds, the DSI is operated passively according to exhaust aftertreatment requirements and conditions at operation 214, i.e., normal operation of DSI. While not explicitly shown, a driver warning may be issued by the controller when either of the water reservoirs exceed the water threshold. For example, a warning lamp or massage may be displayed on the instrument panel or display.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A diesel engine system comprising:
   an engine;
   an exhaust system connected to the engine, the exhaust system including an aftertreatment device, an exhaust pipe upstream of the aftertreatment device, and a fuel injector connected to the exhaust pipe;
   a water-fuel separator including a filter configured to separate water from fuel, a reservoir configured to store the separated water, and a reservoir-drain port opening into the reservoir;
   a fuel line connecting the reservoir-drain port in fluid communication with the fuel injector
   a secondary water-fuel separator in fluid communication with the water-fuel separator, the secondary water-fuel separator including a second reservoir configured to store separated water and a second reservoir-drain port opening into the second reservoir; and
   a second fuel line connecting the second reservoir-drain port in fluid communication with the fuel injector; and,
   a valve having a first inlet connected to the fuel line, a second inlet connected to the second fuel line, and an outlet connected to the fuel injector by a third fuel line.

2. The diesel engine system of claim 1 further comprising a controller programmed to:

in response to water within the second reservoir exceeding a first threshold, command the valve to connect the second reservoir in fluid communication with the fuel injector, and in response to water within the reservoir exceeding a second threshold and the water within the second reservoir being less than the first threshold, command the valve to connect the reservoir in fluid communication with the fuel injector.

3. The diesel engine system of claim 1, wherein the water-fuel separator further includes an inlet port in fluid communication with a fuel tank and an outlet port in fluid communication with the engine.

4. A diesel engine system comprising:
an engine;
an exhaust system connected to the engine, the exhaust system including an aftertreatment device, an exhaust pipe upstream of the aftertreatment device, and a fuel injector connected to the exhaust pipe;
a water-fuel separator including a filter configured to separate water from fuel and a reservoir configured to store the separated water, wherein the reservoir is in fluid communication with the fuel injector; and
a valve disposed between the reservoir and the fuel injector, wherein the valve includes a first inlet connected in fluid communication with the reservoir and a second inlet connected in fluid communication with a fuel outlet of the water-fuel separator.

5. The diesel engine system of claim 4 further comprising:
a secondary water-fuel separator in fluid communication with the water-fuel separator.

6. The diesel engine system of claim 4, wherein the valve includes an outlet connected in fluid communication with the fuel injector, wherein the valve has a first position in which the first inlet is in fluid communication with the outlet of the valve and a second position in which the second inlet is in fluid communication with the outlet of the valve.

7. The diesel engine system of claim 6 further comprising a controller programmed to:
command the valve to the first position when water within the secondary water-fuel separator exceeds a first threshold.

8. The diesel engine system of claim 4 further comprising one or more conduits connecting an outlet port of the reservoir to the fuel injector.

9. A diesel engine system comprising:
an engine;
an exhaust system including an aftertreatment device and a fuel injector upstream of the aftertreatment device;
a primary water-fuel separator including a first reservoir;
a secondary water-fuel separator including a second reservoir, wherein the first and second reservoirs are arranged to independently supply fuel to the fuel injector; and
a valve having a first inlet connected in fluid communication with the first reservoir, a second inlet connected in fluid communication with an outlet of the primary water-fuel separator, and an outlet connected in fluid communication with the fuel injector.

* * * * *